Patented Oct. 26, 1926.

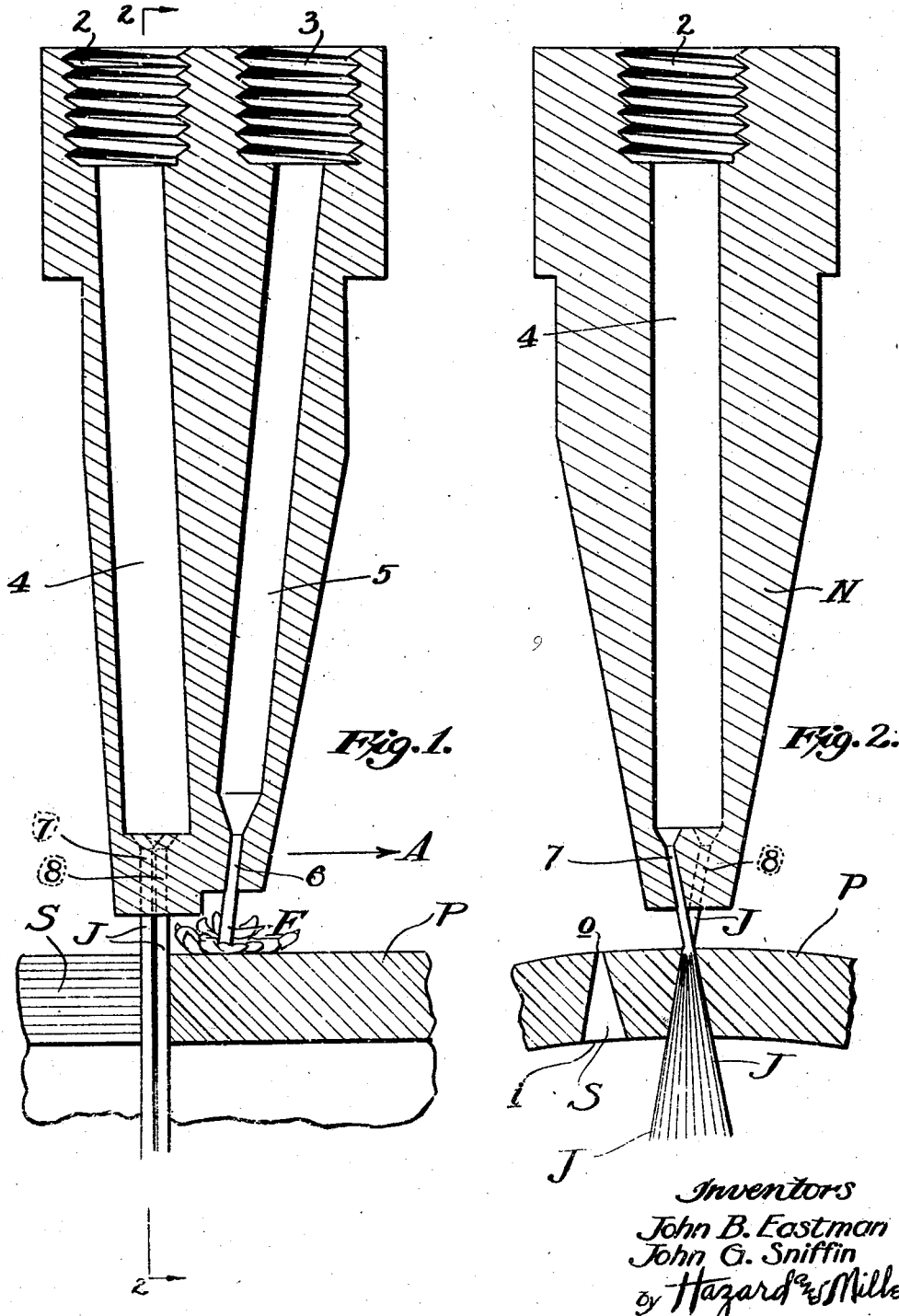

1,604,890

UNITED STATES PATENT OFFICE.

JOHN B. EASTMAN AND JOHN G. SNIFFIN, OF LOS ANGELES, CALIFORNIA, ASSIGNORS, BY MESNE ASSIGNMENTS, OF ONE-HALF TO KOBE, INC., OF LOS ANGELES, CALIFORNIA, A CORPORATION OF CALIFORNIA; ONE-FOURTH TO PACIFIC OIL TOOL COMPANY, OF LOS ANGELES, CALIFORNIA, A CORPORATION OF CALIFORNIA; AND ONE-FOURTH TO GILBERT S. BEESMEYER, OF LOS ANGELES, CALIFORNIA.

ACETYLENE-TORCH NOZZLE.

Application filed February 2, 1923. Serial No. 616,497.

This invention relates to metal cutting torch apparatus, and has for its object to provide an improved nozzle for torch devices.

It is an important object of the present invention to provide an acetylene or other gas burning torch provided with apertures whereby to facilitate the cutting of kerfs, as in metal pipes, and producing kerfs having inwardly or downwardly divergent or flaring walls. In other words, it is an object to provide an acetylene torch nozzle with jet discharging apertures so arranged that in the one application of the torch, a kerf will be made, especially in a pipe in which the kerf will have a narrower outer mouth than the inner mouth thereof so that the walls of the kerf relatively diverge or flare inwardly or downwardly.

A further object is to provide a method for producing inwardly or downwardly divergent or flaring walls of a torch cut slot.

Other objects and advantages will be made manifest in the following specification of an embodiment of the invention illustrated in the accompanying drawings, wherein—

Figure 1 is a longitudinal central section in a plane through two gas chambers of the nozzle.

Fig. 2 is a section on a plane indicated by the line 2—2 of Fig. 1, and being a plane transverse to one of the chambers in the nozzle.

It is extremely desirable, in certain arts in which pieces of pipe P are utilized, to have perforations or slots S in the pipe, and preferably slots which have a narrower outer mouth o than the inner mouth i so that for purpose of infiltration particles of a size sufficient to pass into the mouth at the outer surface of the pipe, will not become jammed in between the walls of the slot S, since these walls, as are clearly shown in Fig. 2, are, as stated, preferably divergent inwardly or downwardly. The slots, therefore, will be selfclearing of particles passing inwardly or downwardly.

An object of our invention is to provide a gas burning torch nozzle with apertures for so discharging the gas as to rapidly produce a slot or kerf having inwardly or downwardly divergent or flaring walls.

A form of nozzle N is here shown having tapped holes 2 and 3, the former leading into an oxygen discharging chamber 4, and the latter into a combustible gas or mixture chamber 5. The initial or preheating jet is produced at a discharge aperture 6 leading from the chamber 5, and as the nozzle is advanced in the direction of the arrow A, the jet F will preheat the pipe material P.

According to our invention, we provide for the discharging of oxygen jets J substantially toward and into the hot spot made by the jet F.

We have shown, therefore, a plurality of outlets 7 and 8 leading from the oxygen chamber of the nozzle, and these outlets or apertures are in offset planes, as shown in Fig. 1, and, further, are so angularly converged outwardly that the jets J will be discharged in separate paths sufficiently spaced to prevent interference of the jets, as shown in Fig. 1, and at the same time to cause the discharge of the oxygen jets inwardly or downwardly through the outer mouth of the slot produced in the pipe. In other words, the oxygen jets J move in streams crossing each other angularly, as in Fig. 2, the width of the crossing zones of the streams being about equal to the mouth of the slot as produced, this being made possible by virtue of the substantial lateral spacing of the jets so that the streams will cross each other without interference and having an axis of intersection, which axis will be maintained substantially in the plane of and along the center of the outer mouth of the cut slot S. Therefore, from the point of divergency of the jets or streams J inwardly or downwardly beyond the outer surface of the pipe, the jets will serve to angularly cut back, in diverging or flaring relation, the side walls of the slot S, as such slot is clearly shown in finished condition to the left in Fig. 2.

From the above it will be seen that we have provided a nozzle having means for discharging an initial heating flame and for discharging in paths behind the heating flame jets as of oxygen, which jets diverge relatively from each other at a point substantially coinciding with the mouth of the slot at the outer surface of the pipe with a result that a slot of inwardly or downwardly divergent or flaring is produced. In other words, the cutting jets converge and cross approximately at the surface of the work and diverge or flare from the surface of the work inwardly or downwardly, the jets being in offset planes and passing each other without interference.

Further embodiments, modifications and variations may be resorted to within the spirit of the invention as here claimed.

What is claimed is:

1. The method for cutting a slot having inwardly or downwardly divergent or flaring walls which consists of applying a heating flame to the metal to be cut, and directing cutting jets against the hot metal, said cutting jets converging and passing each other at the surface of the metal and diverging or flaring inwardly or downwardly.

2. The method for cutting a slot having downwardly flaring walls which consists of applying an acetylene flame to the metal to be cut, and directing oxygen cutting jets against the hot metal, said cutting jets converging and passing each other substantially at the surface of the metal and flaring below the surface.

In testimony whereof we have signed our names to this specification.

JOHN B. EASTMAN.
JOHN G. SNIFFIN.